June 27, 1967 D. P. STRANDBERG 3,328,699

FREQUENCY REPRODUCING SYSTEM

Filed Nov. 19, 1963 4 Sheets-Sheet 1

INVENTOR.
DONALD P. STRANDBERG

BY John F. Lawler
ATTORNEY

FREQUENCY REPRODUCING SYSTEM

Filed Nov. 19, 1963 4 Sheets-Sheet 2

INVENTOR.
DONALD P. STRANDBERG
BY John F. Lawler
ATTORNEY

June 27, 1967 D. P. STRANDBERG 3,328,699

FREQUENCY REPRODUCING SYSTEM

Filed Nov. 19, 1963 4 Sheets-Sheet 3

INVENTOR.
DONALD P. STRANDBERG

BY John L. Lawler
ATTORNEY

INVENTOR.
DONALD P. STRANDBERG
BY John F. Lawler
ATTORNEY

United States Patent Office 3,328,699

Patented June 27, 1967

3,328,699

FREQUENCY REPRODUCING SYSTEM

Donald P. Strandberg, Sunnyvale, Calif., assignor to Sylvania Electric Products Inc., a corporation of Delaware Filed Nov. 19, 1963, Ser. No. 324,776
8 Claims. (Cl. 325—423)

This invention relates to an improved system for automatically reproducing the frequency of an incident signal.

Pulse communication systems are capable of transmitting more information at higher power levels and in narrower frequency bands than are conventional voice-modulation type continuous wave systems. Pulse systems are finding increasing application in satellite communication systems. A pulse communication system for amplifying a small incident signal up to full transmitter power (in the order of 100 watts) with a bandwidth wider than 2 megacycles requires a physically large and heavy transceiver. Although relatively lightweight solid state equipment can be designed to increase the level of an incident signal 100 db to the milliwatt level, physically large and heavy equipment is required to further increase the wide-band signal level to the plus 50 dbm or 100 watts transmission level. As size and weight considerations are very important in portable and satellite systems, it may be desirable to reconstruct the incident signal at high power levels rather than to amplify it at full bandwidth. This is accomplished by storing the information in the incident signal while a signal whose frequency is equal to that of the incident signal is generated. The information may be stored in miniaturized circuitry. The stored information and generated signal are recombined for transmission.

Present day automatic frequency reproducing (AFR) systems employ null seeking techniques. Such a system may mix an incident radio frequency (RF) signal with the output of a variable frequency oscillator for generating an intermediate frequency signal which is applied to a frequency discriminator. The frequency discriminator provides an output with an amplitude proportional to the frequency of the input. The discriminator output is a particular reference potential for an incident signal having a particular frequency called the crossover frequency and is greater than or less than this reference potential when the frequency of the incident signal is greater than or less than the crossover frequency, respectively. This discriminator output is applied to the variable frequency oscillator for adjusting its output frequency to cause the generated intermediate frequency signal to be equal to the crossover frequency. The output of a fixed frequency oscillator, having a natural frequency equal to the discriminator crossover frequency, is mixed with the signal generated by the variable frequency oscillator for reproducing the incident RF signal. Since the discriminator and the means of biasing it are susceptible to variation with time and under changing ambient conditions, the crossover frequency may vary or drift during operation. In null seeking AFR systems of the type described above, a drift in the discriminator crossover frequency, or the frequency, of the fixed frequency oscillator, results in a difference in the frequencies of the incident and reproduced signals. This frequency difference is equal to the difference between the changed crossover frequency and the frequency of the fixed frequency oscillator.

An object of this invention is the provision of an AFR system which corrects for drift of the discriminator characteristic of the signal reproducing system.

Another object is the provision of an AFR system which corrects for frequency drift of the signal source of the signal reproducing system.

In accordance with this invention an intermediate frequency (IF) signal and the output of a signal source for reproducing the IF signal are applied in time sequence to the same frequency discriminator circuit. The discriminator circuit output, which is proportional in time sequence to the frequencies of the IF and source signals, is processed by a difference generator. The difference generator produces a difference signal which is proportional to the difference in frequencies of the IF and source signals. This difference signal is applied to the signal source for changing its frequency to be more nearly equal to the frequency of the IF signal.

This invention and these and other of its objects will be more fully understood by reference to the following description of a preferred embodiment of the invention, reference being had to the accompanying drawings, in which.

Figure 1:
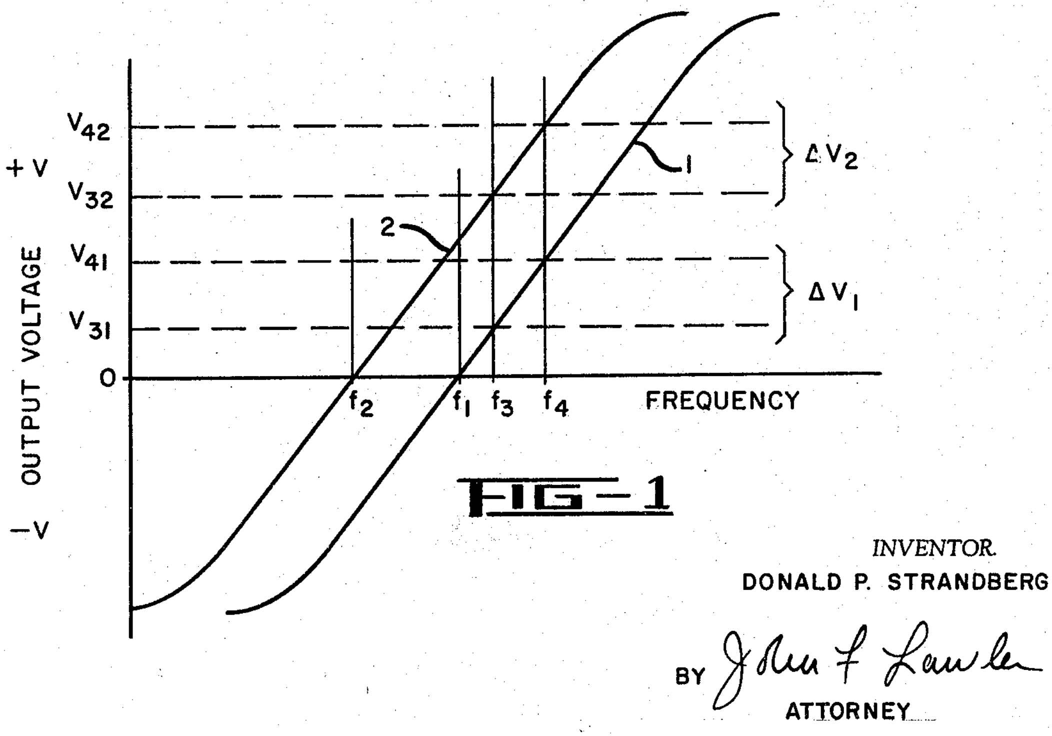
FIGURE 1 is a plot of a frequency discriminator output showing the amplitude of the discriminator output as a function of the frequency of the discriminator input.

Particular reference being had to FIGURE 1, waveform 1 is a plot of the amplitude of the voltage output of a frequency discriminator as a function of the frequency of the discriminator input. The discriminator has a crossover frequency $f_1$ defined as the frequency of the discriminator input for which the amplitude of the discriminator output is a predetermined value such as zero volts in FIGURE 1. Waveform 2 has a crossover frequency $f_2$ but is otherwise identical to waveform 1.

A better understanding of the problem to which this invention is addressed will be had by reference to the waveforms of FIGURE 1. Conventionally AFR systems have zero null-seeking circuitry. Thus, an AFR system having a frequency characteristic such as waveform 1 in FIGURE 1 has a crossover frequency $f_1$. If the input to the discriminator is a signal having a frequency $f_3$, the discriminator output $V_{31}$ may be used as a feedback signal to drive the discriminator input signal toward crossover frequency $f_1$. However, if the characteristic of the discriminator should drift in frequency such that its characteristic is represented by waveform 2, the error signal produced by an input signal having a frequency $f_3$ is $V_{32}$ which is larger than $V_{31}$. This feedback signal causes the discriminator input to be driven to an incorrect crossover frequency $f_2$ rather than the desired frequency $f_1$.

In accordance with this invention, difference null seeking circuitry is employed for controlling the frequency of the generated signal. A frequency discriminator having an IF signal input whose frequency is $f_3$ generates an output $V_{31}$ as determined from waveform 1. Similarly, if a source signal having a frequency $f_4$ is applied to the same frequency discriminator an output $V_{41}$ is generated. A control signal $\Delta V_1$ is fed back to the source of the source signal for controlling the frequency of its output. This control signal $\Delta V_1$ causes the frequency of the source signal to approach the frequency of the input IF signal and thus causes the control signal $\Delta V_1$ to approach zero volts.

If the discriminator characteristic of waveform 1 drifts to the position of waveform 2, and assuming the same IF and source frequencies $f_3$ and $f_4$, the magnitudes of the discriminator outputs are $V_{32}$ and $V_{42}$, respectively. The new control signal is $\Delta V_2$, the difference in potential between $V_{42}$ and $V_{32}$. The potentials $V_{32}$ and $V_{42}$ are greater than $V_{31}$ and $V_{41}$, respectively. The feed back control signals or differences in potentials $\Delta V_2$ and $\Delta V_1$ are equal, however, provided the slopes of the discriminator characteristics of waveforms 1 and 2 are equal for the discriminator input frequencies and provided the circuit operates on the linear portion of the discriminator characteristic. It is important to note that it is the difference between the discriminator outputs ($V_{42}-V_{31}$ and $V_{42}-V_{32}$) rather than the crossover frequencies $f_1$ and $f_2$ that are used in determining the control signals $\Delta V_1$ and $\Delta V_2$. As this invention employs circuitry seeking a null in the difference or control signal rather than seeking the zero or crossover frequency and as the generated difference control signals are equal, the undesirable effects of oscillator and discriminator drift are eliminated.

Figure 2:
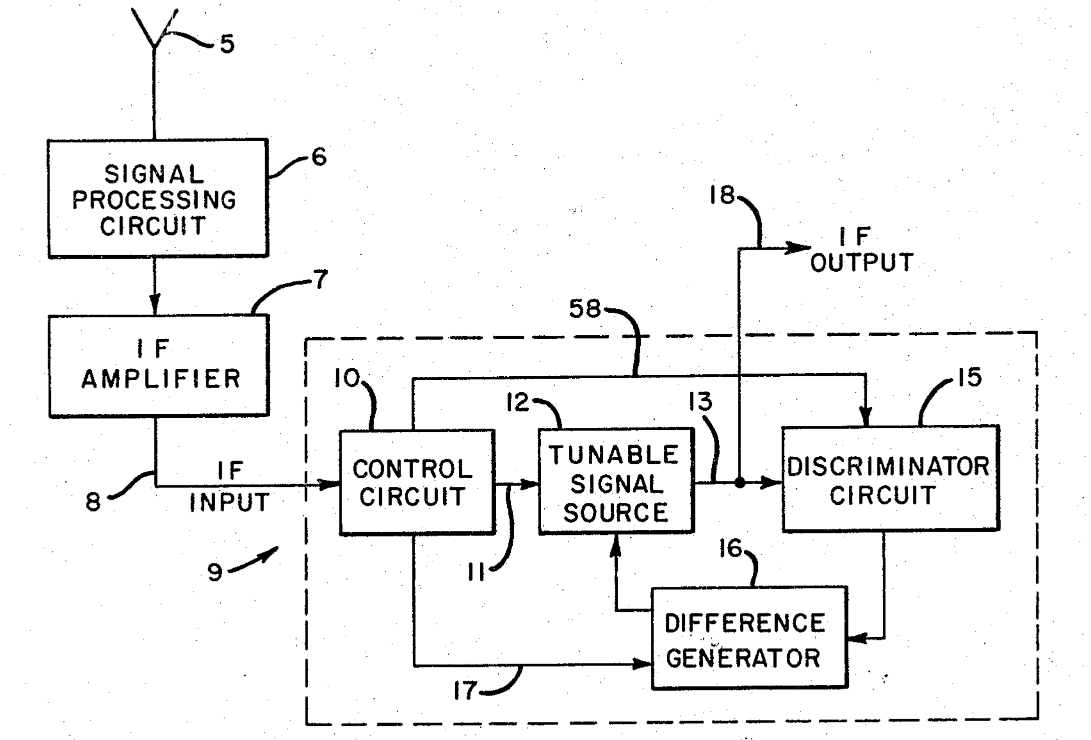
FIGURE 2 is a block diagram of a system for reproducing a signal in frequency and in phase and embodying this invention.

As illustrated in FIGURE 2, an incident RF signal is received by an antenna 5 and is applied to a signal processing circuit 6 which comprises circuitry for producing an IF signal which is more easily processed than the RF signal. The IF signal is amplified by IF amplifier 7 and is applied on line 8 to an automatic frequency reproducing (AFR) circuit 9 which reproduces the IF signal with the same frequency and phase.

The IF signal on line 8 initiates operation of control circuit 10 which generates control signals which control the sequence or order of operations of the remainder of circuit 9. Specifically, as will be described more fully hereinafter, a control signal on line 11 controls the application of an IF signal and a signal from a tunable signal source 12 to a discriminator circuit 15. A control signal on line 17 controls the operation of a difference generator 16 which samples and stores the output of discriminator circuit 15 at predetermined times.

The IF signal on line 8 is passed on line 11, for a predetermined time interval determined by control circuit 10, through tunable signal source 12. Signal source 12 furnishes alternating current signals having a frequency close to the frequency of the IF signal generated by signal processing circuit 6. A signal is fed back to the signal source 12, as will be described hereinafter, for adjusting the frequency of the source signal to equal the frequency of the IF signal. Source 12 is preferably a voltage tunable coherent oscillator whose output has a fixed phase relationship with respect to the phase of its input. In order to initially pass the IF signal, source 12 may be a normally conducting active amplifying element, which oscillates in response to a predetermined input condition, for example, when the IF signal is removed from line 11.

The IF and source signals are successively applied on line 13 to discriminator circuit 15 in the time sequence determined by control circuit 10. Discriminator circuit 15 produces an output whose amplitude is proportional to the frequency of its input. Thus, the amplitude of the discriminator circuit output is in time sequence successively proportional to the frequency of the IF signal and to the frequency of the source signal.

The output of discriminator circuit 15 is sampled and processed by difference generator 16 in a sequence determined by control source 10 on line 17. The difference generator produces an output which is proportional to the difference in frequencies of the IF and source signals. This difference signal is applied to signal source 12 for causing the frequency of its output to equal the frequency of the IF signal. The reproduced IF signal generated by AFR circuit 9 is taken on line 18 connected to the output of signal source 12.

Figure 3:
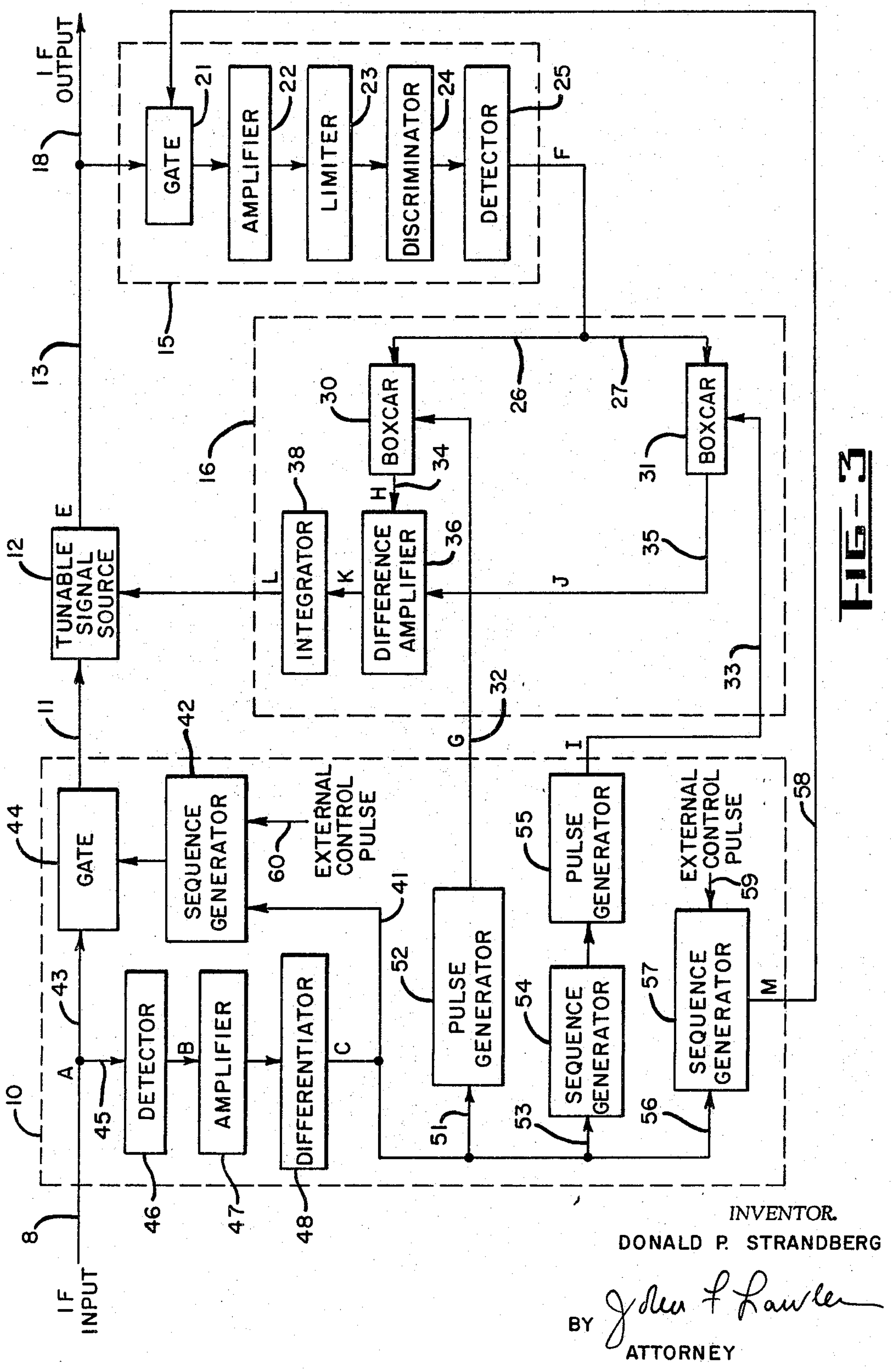
FIGURE 3 is a more detailed block diagram of the system of FIGURE 2.

In order to insure that the amplitude of the output of discriminator circuit 15 is proportional to its input frequency rather than to its input amplitude, circuit 15, see FIGURE 3, comprises a series connection of a gate 21, amplifier 22, limiter 23, frequency discriminator 24 and detector 25. Gate 21 controls the passing of the input signal. Amplifier 22 and limiter 23 remove any amplitude modulation of the IF and source signals. This provides a constant amplitude input to frequency discriminator 24 and detector 25. Frequency discriminator 24 converts the frequency variations of the amplitude limited signal to amplitude variations. Amplitude modulation detector 25 rectifies the amplitude modulated frequency discriminator output for obtaining a signal, clamped to zero signal level, varying in amplitude in accordance with the amplitude of its input wave.

Difference generator 16, see FIGURE 3, comprises box-car circuits 30 and 31, a difference amplifier 36 and an integrator 38. Each box-car circuit is a pulse lengthening circuit comprising a gate and a storage element for lengthening a pulse without changing its amplitude. Box-car circuit 30 samples the discriminator circuit output on line 26 and stores the signal proportional to the frequency of the IF signal in response to a control signal from control circuit 10 on line 32. Similarly, box-car circuit 31 samples the signal on line 27 for storing the signal proportional to the frequency of the source signal in response to a control signal on line 33. The signals stored by box-car circuits 30 and 31 are directly coupled to difference amplifier 36 on lines 34 and 35, respectively.

Differential amplifier 36 is preferably a DC amplifier which compares the unidirectional or DC signals stored by the box-cars and generates an output proportional to the difference between these stored signals and thus proportional to the difference in the frequencies of the IF and source signals. The DC difference signal generated by amplifier 36 is converted by integrator 38 to a time varying linear voltage which is applied to signal source 12 for controlling its frequency of oscillation.

Control circuit 10, see FIGURE 3, comprises a sequence generator 42, a gate 44 and a detector 46, amplifier 47 and differentiator 48. The IF signal on line 8 is split in the control circuit between lines 43 and 45. The IF signal on line 43 passes through initially conducting or open gate 44 and signal source 12. The IF signal on line 45 is rectified by detector 46 and amplified to provide a signal symmetrical to the envelope of the IF signal and clamped to a reference level. The rectified IF signal is differentiated by differentiator 48 to provide a synchronizing or timing pulse 50, see waveform C of FIGURE 4, which is applied on line 41 to sequence generator 42. Sequence generator 42, which may comprise a monostable multivibrator and a delay circuit, is actuated by timing pulse 50 to close gate 44 to block the IF signal on line 43. The absence of the IF signal at the input of source 12 causes the latter to oscillate.

Timing pulse 50 is also applied on line 51 to pulse generator 52 and on line 53 to sequence and pulse generators 54 and 55 to synchronize actuation of the generators which produce control signals on lines 32 and 33 for controlling the time sequence of operations of box-cars 30 and 31, respectively. Pulse generators 52 and 55 may be blocking oscillators or multivibrators. Sequence generator 57 is actuated by timing pulse 50 on line 56 for generating a control signal on line 58 for controlling the operation of gate 21 and thus of the remainder of discriminator circuit 15. Sequence generators 54 and 57 may comprise a delay circuit and a monostable multivibrator.

Figure 4:
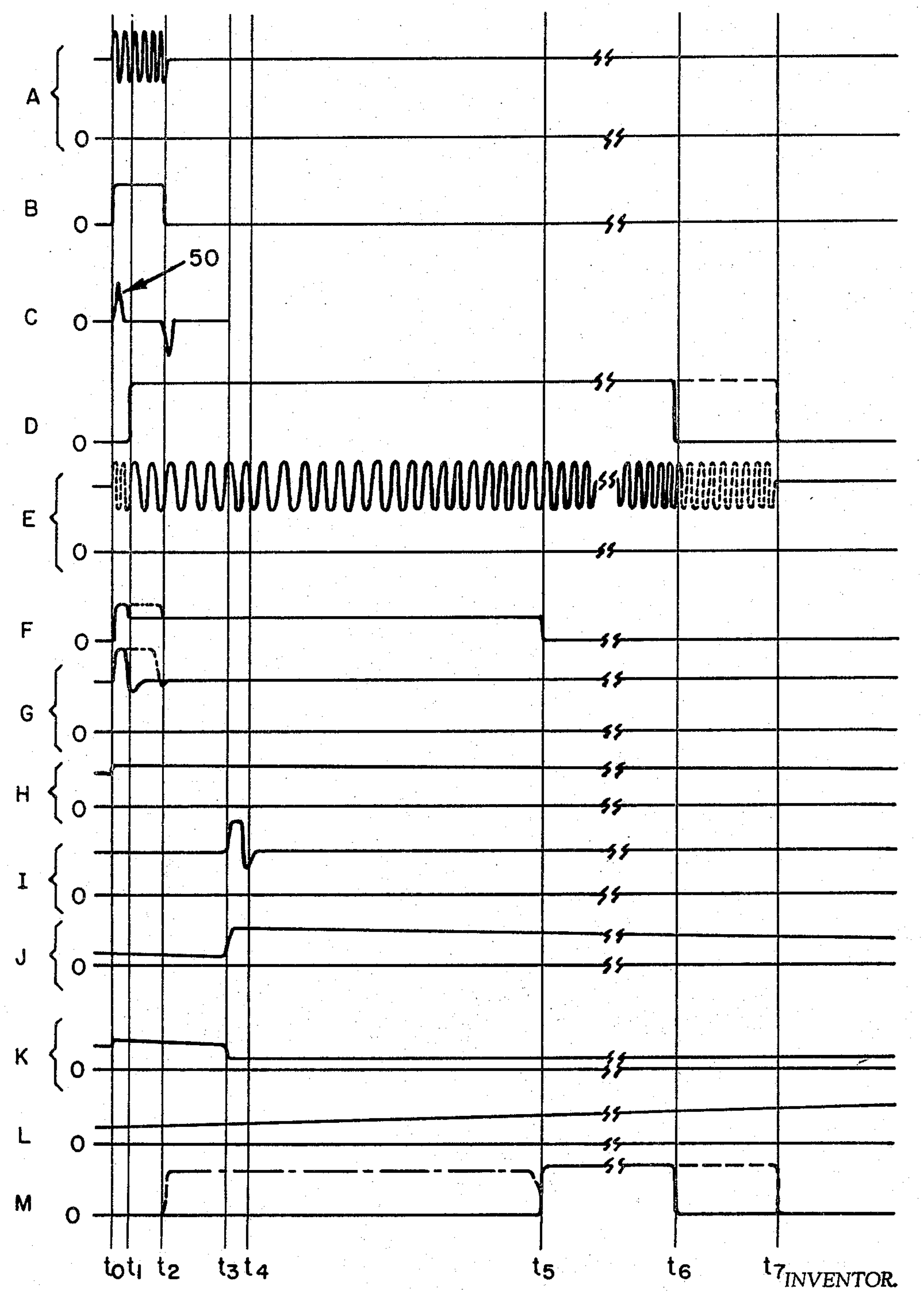
FIGURE 4 is a family of waveforms illustrating the operation of the system of FIGURE 3.

This invention will be more clearly understood from the following operational analysis of the system of FIGURE 3 in conjunction with the waveforms of FIGURE 4.

The amplified IF signal (waveform A of FIGURE 4) on line 8 passes on line 43 through normally open gate 44 and signal source 12 and appears on line 13 as waveform E (broken line) between times $t_0$ and $t_1$. The IF signal on line 45 is detected (waveform B) and differentiated (waveform C) for providing the synchronizing or timing pulse 50 which indicates receipt of an incident signal. Timing pulse 50 causes sequence generator 42 to generate a control signal (waveform D) for closing gate 44 at time $t_1$ and blocking passage of the IF signal to source 12. The closing of gate 44 at time $t_1$ initiates oscillation of signal source 12, as indicated at time $t_1$ in waveform E. Waveform E therefore comprises the IF signal between times $t_0$ and $t_1$ and the source signal for time greater than $t_1$.

The signals on line 13 pass through initially open gate 21 of discriminator circuit 15 and are limited by limiter 23 so as to have a relatively constant magnitude at the input of frequency discriminator 24. The magnitude of the output of detector 25 (waveform F) is proportional to the frequency of the IF signal between times $t_0$ and $t_1$ and the frequency of the source signal for time greater than $t_1$.

Box-car circuits 30 and 31 are initially closed. Pulse generator 52 is actuated by timing pulse 50 to generate a control pulse (waveform G) on line 32 for opening box-car 30 for the indicated period less than $t_1$–$t_0$ for sampling the discriminator circuit output. Box-car 30 stores (waveform H) the signal on line 26 (waveform F, time $t_0$ to $t_1$). The decay of the stored signal is indicated by the negative slope in the waveform H prior to time $t_0$. Variations in the frequency of the IF signal are indicated by the change in amplitude when the IF signal is sampled at time $t_0$.

Sequence generator 54 is triggered by timing pulse 50 to actuate pulse generator 55 after a predetermined time delay ($t_3$–$t_1$ in waveform I) for opening box-car 31. Box-car 31 samples the output of discriminator circuit 15 during the time $t_3$ to $t_4$ in response to the control signal (waveform I) on line 33. Box-car 31 stores (waveform J) the signal on line 27 (waveform F, time $t_1$ to $t_5$). It is preferable to employ a time delay, such as $t_3$–$t_1$ of waveform I, between samplings by box-cars 30 and 31 in order that any transients generated by a change of signal levels at time $t_1$ will be damped before sampling the discriminator circuit output. By way of illustration, the abrupt change in the level of the signal stored by box-car 31 (time $t_3$ of waveform J) illustrates that the frequency of the source signal is higher than it was during the previous sampling interval.

Differential amplifier 36 continually compares and produces an output (waveform K) proportional to the difference in magnitude of the signals stored by box-cars 30 and 31 (waveforms H and J). This difference signal is integrated by integrator 38 for producing a time varying linear voltage (waveform L) which is applied to signal source 12 for varying its frequency to more nearly equal that of the IF signal. The magnitude of the difference signal (waveform K at time $t_3$) is proportional to the difference in the frequencies of the IF and source signals. Thus, the abrupt change in the level of the difference signal (waveform K) at time $t_3$ indicates that the difference in frequencies between the IF and source signals is less than it was for the previous sampling interval as a result of feeding the difference signal back to the signal source 12.

When very accurate reproduction of a pulsed incident signal is desired control of the time the discriminator circuit gate 21 is open is required in order to insure that the energy content applied to the discriminator circuit will be the same for each pulse. This control is achieved by activating sequence generator 57 with timing pulse 50. At time $t_5$, generator 57 provides a control signal (waveform M) which is applied to close gate 21 (waveform F) a predetermined time after an IF signal is received.

In order to reset signal reproducing circuit 9 for receipt of the next IF pulse, gate 44 of control circuit 10 and gate 21 of discriminator circuit 15 must be opened. Gates 44 and 21 may be manually reset at a time, such as time $t_6$ in waveforms D and M, by sequence generators 42 and 54 in response to an external control signal. The external control signal may be applied on line 59 to sequence generator 57 and on line 60 to sequence generator 42. If gates 44 and 21 are not manually reset earlier, they are reset automatically at time $t_7$ (indicated by the broken lines in waveforms D and M) after a time delay determined by sequence generators 42 and 54, respectively. Signal source 12 is rendered inoperative in response to the opening of gate 44 and the circuit is ready for the receipt of another IF signal.

Figure 5:
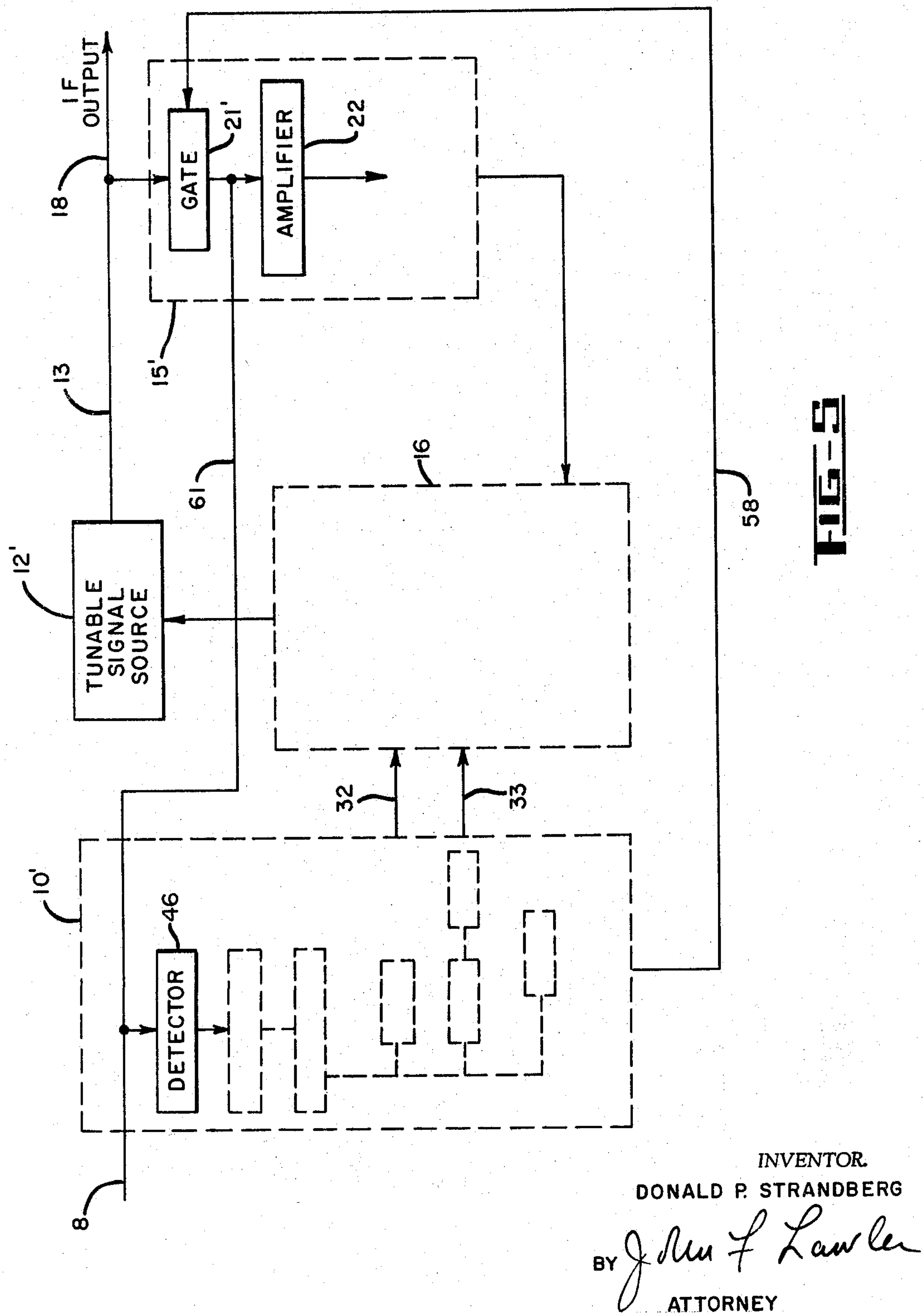
FIGURE 5 is a modified block diagram of the AFR system of FIGURE 3 for reproducing a signal in frequency.

A modified form of this invention for reproducing an input signal in frequency, wherein the phase relationship between the signals is unimportant, is illustrated in FIGURE 5. The input signal on line 8 to control circuit 10′ is directly connected on line 61 to the input to amplifier 22 of discriminator circuit 15′. The output of tunable signal source 12′, which is preferably a voltage tunable continuous wave oscillator, is applied on line 13 to normally closed gate 21′ of discriminator circuit 15′. Gate 21′ is opened to pass the source signal in response to a control signal from control circuit 10′ on line 58. In other respects, the circuits of FIGURES 3 and 5 are the same.

The amplified IF signal (waveform A) on line 8 is applied on line 61 to amplifier 22 of discriminator circuit 15′. The modified discriminator circuit produces an output that is proportional to the frequency of the IF pulse signal on line 8 throughout its width as illustrated by the signal in broken lines between times $t_0$ and $t_2$ of waveform F. Normally closed gate 21′ blocks the continuous wave output of tunable signal source 12′ until the gate actuating signal (shown in broken lines in waveform M between time $t_2$ and $t_5$) on line 58 opens the gate at time $t_2$. The modified discriminator circuit 15′ produces an output that is proportional to the frequency of the signal source during the time greater than $t_2$ that gate 21′ is open. The reproduced IF signal generated by the AFR circuit is taken on line 18 connected to the output of signal source 12′.

Although this invention has been illustrated and described with reference to a preferred embodiment thereof, it is understood that the scope of the invention is not limited thereto, but is determined by the scope of the appended claims.

What is claimed is:

1. A system for reproducing an incident signal with the same frequency, said system comprising
- a source for generating reproduced signals,
- a control circuit responsive to the incident signal for producing an output, and
- difference generating means responsive to the output of said control circuit for rendering said generating means sequentially responsive to the incident signal and to the reproduced signal for generating an output proportional to the difference in frequencies thereof, said source being responsive to the output of said difference generating means for causing the frequency of the reproduced signal to approach the frequency of the incident signal.

2. A system for reproducing an incident signal with the same frequency, said system comprising
- a source for generating reproduced signals,
- a discriminator circuit sequentially responsive to the incident signal and to the reproduced signal for generating an output with a magnitude that is sequentially proportional to the frequencies of the incident signal and the reproduced signal, and
- a difference generator sequentially responsive to the discriminator circuit output for producing an output proportional to the difference in frequencies of the incident and produced signals, said source being responsive to the output of said difference generator for causing the frequency of the reproduced signal to approach the frequency of the incident signal.

3. A system for reproducing an incident signal with the same frequency, said system comprising
- a source for generating reproduced signals,
- a control circuit responsive to the incident signal for producing an output,
- a discriminator circuit sequentially responsive to the incident signal and to the reproduced signal for generating an output with a magnitude that is sequentially proportional to the frequencies of the incident and reproduced signals, and
- a difference generator responsive to the output of said control circuit for being sequentially responsive to the discriminator circuit output for producing an output proportional to the difference in frequencies of the incident and reproduced signals, said source being responsive to the output of said difference generator for causing the frequency of the reproduced signal to approach the frequency of the incident signal.

4. The system according to claim 3 in which said difference generator comprises memory means connected to said discriminator circuit for sequentially sampling the output thereof and producing two outputs, and difference measuring means connected to said memory means and responsive to the outputs thereof for producing a signal equal to the difference of the memory means outputs.

5. The system according to claim 4 in which said memory means comprises a pair of box-car circuits connected in parallel to the output of said discriminator circuit.

6. A system for reproducing an incident signal with the same frequency, said system comprising a control circuit responsive to the incident signal for producing an output, a source for generating reproduced signals and having an output, said source being responsive to the incident signal and to the output of said control circuit for causing said incident signal and said reproduced signal to appear alternately at said output of said source, a discriminator circuit comprising an amplifier connected to said output line of said source, a limiter connected to the output of said amplifier, and a discriminator connected to said limiter and producing an output having a magnitude alternately proportional to the frequencies of said incident signal and said reproduced signal, memory means responsive to the output of said discriminator for producing two outputs proportional in magnitude to the frequencies of said incident and reproduced signal, respectively, a difference amplifier responsive to the outputs of said memory means and producing an error signal proportional to the difference in frequencies of the incident and reproduced signals, an integrator connected to said difference amplifier and responsive to said error signal for producing a time varying linear signal, and means for applying the output of said integrator to said source for causing the frequency of the reproduced signal to approximate that of the incident signal.

7. A system for reproducing an incident signal in frequency and in phase, said system comprising a control circuit responsive to an incident signal for producing control signals, a source responsive to a control signal for producing source signals, a discriminator circuit sequentially responsive to the incident signal and source signal whereby to generate a signal with a magnitude that is sequentially proportional to the frequencies of the incident and source signals, and a difference generator responsive to the discriminator circuit output and a control signal for rendering said generator sequentially responsive to the discriminator circuit output for producing a difference signal which is proportional to the difference in frequencies of the incident and source signals, said source being responsive to the difference signal for causing the frequency of the produced signal to approach the frequency of the incident signal.

8. The system defined in claim 7 wherein said source is a phase coherent oscillator.

References Cited

UNITED STATES PATENTS

| | | | |
|---|---|---|---|
| 3,121,221 | 7/1964 | Sullivan | 325—17 X |
| 3,263,173 | 7/1966 | Collins | 325—420 |

KATHLEEN H. CLAFFY, *Primary Examiner.*

R. P. TAYLOR, *Assistant Examiner.*